G. K. & A. A. LARSON.
WINDOW VENTILATOR.
APPLICATION FILED JAN. 14, 1914.
1,108,505.
Patented Aug. 25, 1914.
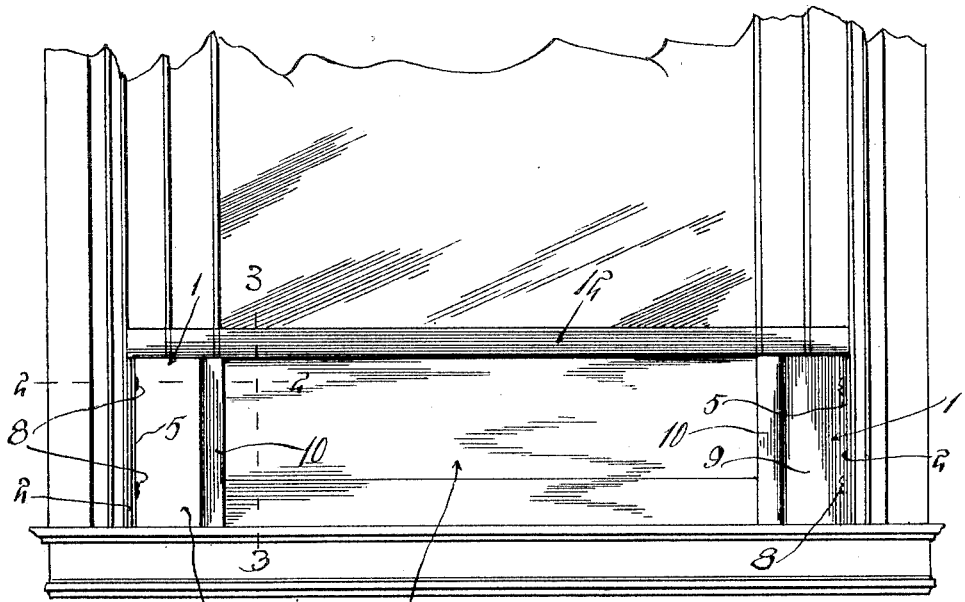
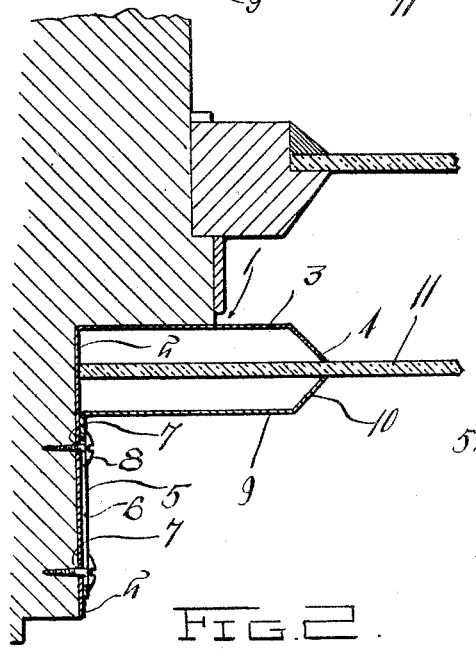
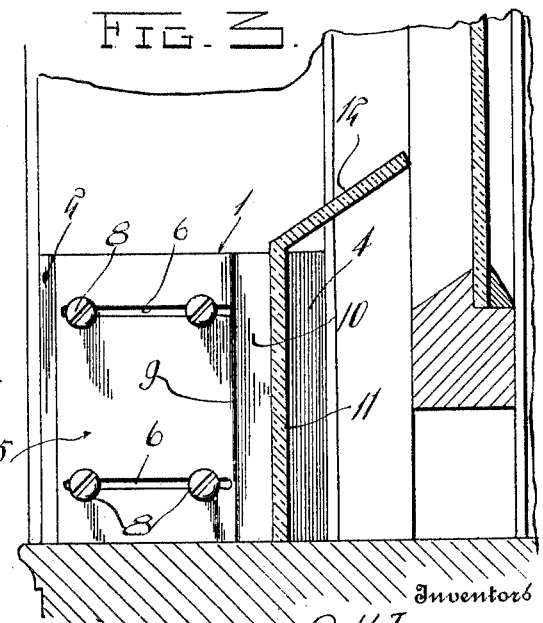
Inventors
G. K. Larson.
A. A. Larson.

UNITED STATES PATENT OFFICE.

GUSTAF K. LARSON AND AUGUST A. LARSON, OF JOHNSONBURG, PENNSYLVANIA.

WINDOW-VENTILATOR.

1,108,505.  Specification of Letters Patent.  Patented Aug. 25, 1914.

Application filed January 14, 1914.  Serial No. 812,085.

*To all whom it may concern:*

Be it known that we, GUSTAF K. LARSON and AUGUST A. LARSON, citizens of the United States, residing at Johnsonburg, in the county of Elk, State of Pennsylvania, have invented certain new and useful Improvements in Window-Ventilators; and we do hereby declare the following to be a full, clear, and exact description of the invention, such as will enable others skilled in the art to which it appertains to make and use the same.

The present invention is directed to improvements in window ventilators, and has for its object to so construct a device of this character that it can be attached to the frame of a window of the usual construction.

A further object of the invention is to so construct a device of this character that when in use the window may be raised and the air directed into the room in an indirect course so as to eliminate drafts.

With these and other objects in view, this invention resides in the novel features of construction, formation, combination and arrangement of parts to be hereinafter more fully described, claimed and illustrated in the accompanying drawing, in which:—

Figure 1 is a front elevation showing the device in position. Fig. 2 is a sectional view on line 2—2 of Fig. 1. Fig. 3 is a similar view on line 3—3 of Fig. 1.

The ventilator comprises brackets 1, each of which consist of plates 2, said plates terminating at their outer ends in flanges 3, said flanges being disposed at right angles to the plates 2 and terminate in inclined edges 4. The brackets further consist of plates 5 which are provided with longitudinal slots 6, said slots being adapted to register with the perforations 7 formed in the plates 2 so that when the securing devices 8 are engaged in the registered slots and perforations the brackets are firmly secured to the sides of the window frame. Thus it will be seen that by providing the plates with slots 6 that said plates can be adjusted in respect to the plates 2 so that the right angle flanges 9 carried thereby may be adjusted in proper relation to the flanges 3. The flanges 9 are also provided with inclined edges 10 which coöperate with the similar edges 4 of the flanges 3 to clamp the side edges of the plate 11 in proper spaced relation from the window sash. The plate 11 is preferably formed from glass so that the same will be strictly sanitary and by forming the same from glass the light will be unobstructed through the window.

The upper edge of the plate 11 is inclined outwardly, as at 12, so as to restrict the air inlet between the sash and the plate 11.

From the foregoing description it will be seen that a ventilator has been provided for windows which is extremely simple, efficient in operation, and one which can be easily and quickly applied to the usual window frame.

Further it will be noted that by constructing the brackets in the manner described that the side edges of the plate 11 can be effectually clamped so as to prevent rattling or accidental displacement thereof.

What is claimed is:—

A window ventilator comprising a pair of brackets for engaging the sides of a window frame, said brackets consisting of perforated plates having their outer ends terminating in right angle flanges, second plates having slots formed therein for registry with the perforations of the first named plates, the second named plates terminating in right angle flanges, and securing devices engaging the sides of the window frame and passing through the slots and perforations of the respective plates for holding said plates in relative adjusted positions, and thus the right angle flanges, a plate having its side edges clampingly engaged between said flanges, said plate having its upper edge inclined outwardly, as and for the purpose set forth.

In testimony whereof, we affix our signatures, in the presence of two witnesses.

GUSTAF K. LARSON.
AUGUST A. LARSON.

Witnesses:
HARRY KOONS,
W. I. SECRIST.

---

Copies of this patent may be obtained for five cents each, by addressing the "Commissioner of Patents, Washington, D. C."